(12) United States Patent
Stern

(10) Patent No.: US 8,344,548 B2
(45) Date of Patent: Jan. 1, 2013

(54) PHOTOVOLTAIC POWER PLANT WITH MINIMIZED POWER COLLECTION LOSSES

(75) Inventor: Michael Joseph Stern, Westlake Village, CA (US)

(73) Assignee: Renewable Power Conversion, Inc., San Luis Obispo, CA (US)

( * ) Notice: Subject to any disclaimer, the term of this patent is extended or adjusted under 35 U.S.C. 154(b) by 215 days.

(21) Appl. No.: 12/723,670

(22) Filed: Mar. 14, 2010

(65) Prior Publication Data

US 2010/0237703 A1    Sep. 23, 2010

Related U.S. Application Data

(60) Provisional application No. 61/160,795, filed on Mar. 17, 2009.

(51) Int. Cl.
*H02J 1/00* (2006.01)
*H02J 3/00* (2006.01)

(52) U.S. Cl. .......................................................... 307/77
(58) Field of Classification Search ..................... 307/71, 307/77, 43, 45
See application file for complete search history.

(56) References Cited

U.S. PATENT DOCUMENTS

| | | | |
|---|---|---|---|
| 2006/0162772 A1* | 7/2006 | Presher et al. | 136/290 |
| 2009/0207543 A1* | 8/2009 | Boniface et al. | 361/86 |
| 2009/0293864 A1* | 12/2009 | Augenbraun et al. | 126/623 |

* cited by examiner

*Primary Examiner* — Carlos Amaya

(57) ABSTRACT

A photovoltaic power plant design is disclosed where a two-tier DC power collection method is used in concert with specific array field geometries and equipment locations to minimize system wiring costs and/or resistive wiring losses.

13 Claims, 4 Drawing Sheets

DETAIL

US 8,344,548 B2

PHOTOVOLTAIC POWER PLANT WITH MINIMIZED POWER COLLECTION LOSSES

This application claims priority of Provisional Application No. 61/160,795, filed Mar. 17, 2009.

DETAILED DESCRIPTION OF THE INVENTION

Figure 1:
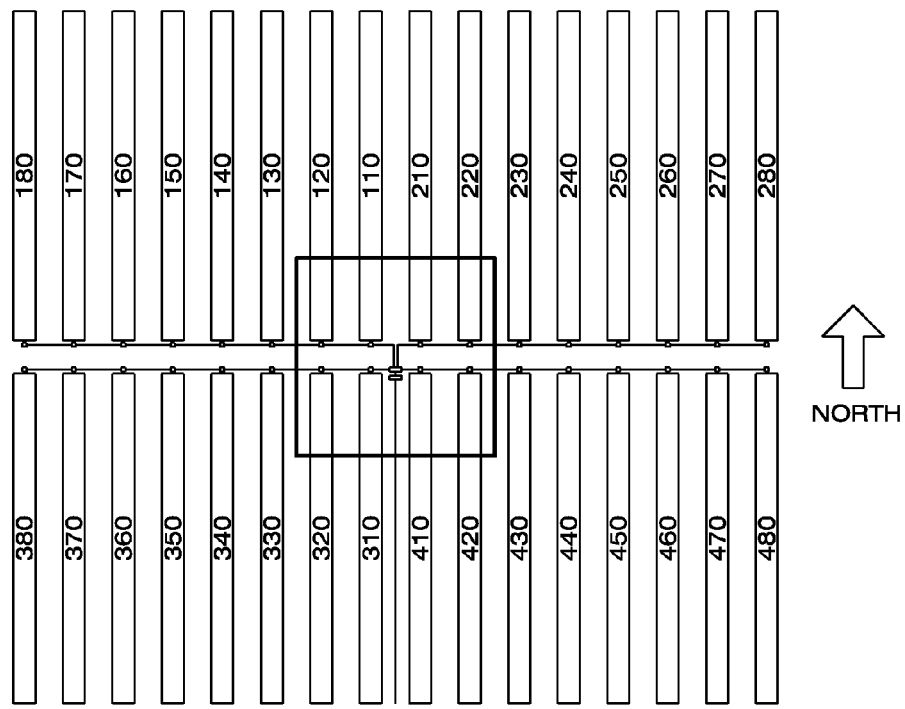
FIG. 1 illustrates the preferred embodiment of the invention, a power plant for converting DC power from photovoltaic sources to AC power comprising a number of photovoltaic modules, a number of components described as field combiner boxes, a master combiner box and a DC-to-AC power converter.
Figure 1:
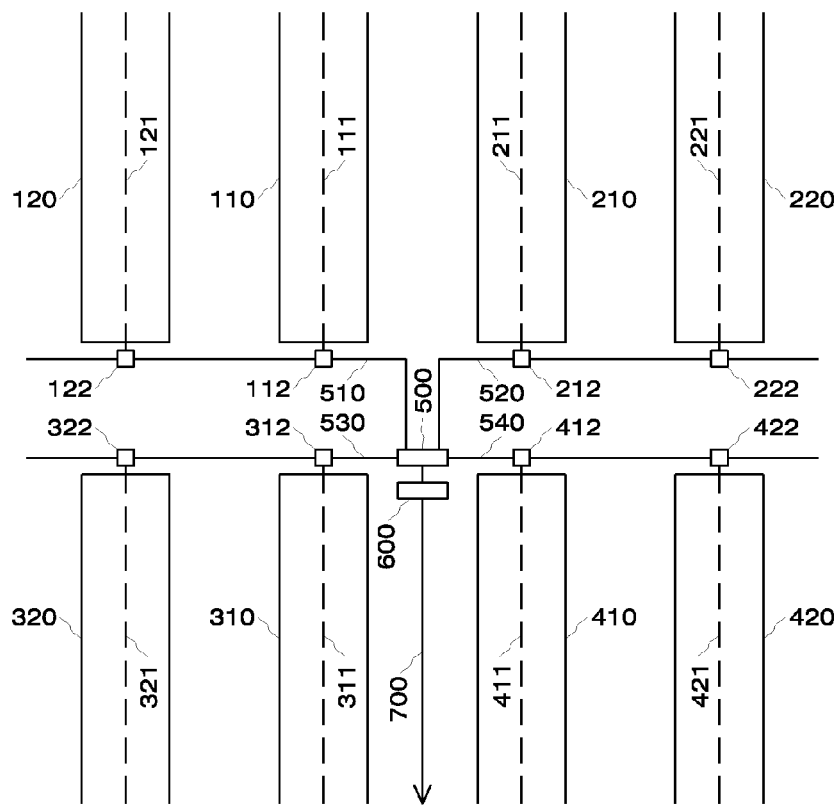

FIG. 1 illustrates the preferred embodiment of the invention, a power plant for converting DC power from photovoltaic sources to AC power comprising a number of photovoltaic modules, a number of components described as field combiner boxes, a master combiner box and a DC-to-AC power converter.

In FIG. 1, rows of photovoltaic modules are arranged in four quadrants, where each quadrant 1, 2, 3 and 4 is identified by the first digit of each reference designator. All rows and all quadrants are equal in composition. The rows are each oriented on a north-south axis. Each row has a single-axis tracking system that positions the plane of the photovoltaic array substantially normal (perpendicular) to the direction of solar radiation, in one axis, by rotating each row from west to east during the course of the day.

The detail shown in FIG. 1 is a center enlargement of the power plant layout illustrated at the top of the page. Row 110 comprises a number of photovoltaic module series strings where each string is configured from a number of photovoltaic modules electrically connected in series. Each series string has a positive and a negative conductor. Each row has a center torque tube running along the rotational axis that also serves as a conduit for all series string conductors. In row 110, all series string conductors run through torque tube 111 and into field combiner box 112. Within field combiner box 112, one conductor from each series string is electrically connected in series with a fuse and then electrically paralleled with all other fused series string conductors. The remaining non-fused conductors of each series string are directly paralleled within field combiner box 112. The outputs of each field combiner box in a given quadrant 1, 2, 3, or 4 are electrically connected in parallel by conductors which make daisy-chain connections from one field combiner box output to the next. The last field combiner box in a chain in each quadrant, boxes 112, 212, 312 and 412 in quadrants 1, 2, 3, and 4, respectively, connect through conduits 510, 520, 530 and 540, respectively, to master combiner box 500. Within master combiner 500, one conductor from each from each of the last field combiner boxes is electrically connected in series with a fuse and then electrically paralleled with all other fused circuits. The remaining four non-fused conductors are directly paralleled within the master combiner box. The output of master combiner box 500 is connected to the input DC-to-AC converter 600. DC-to-AC converter 600 converts the DC power from all the photovoltaic modules in all quadrants to AC polyphase power. The output of DC-to-AC converter 600 is connected to the electric utility grid point of service through underground conduit and conductors 700.

Figure 2:
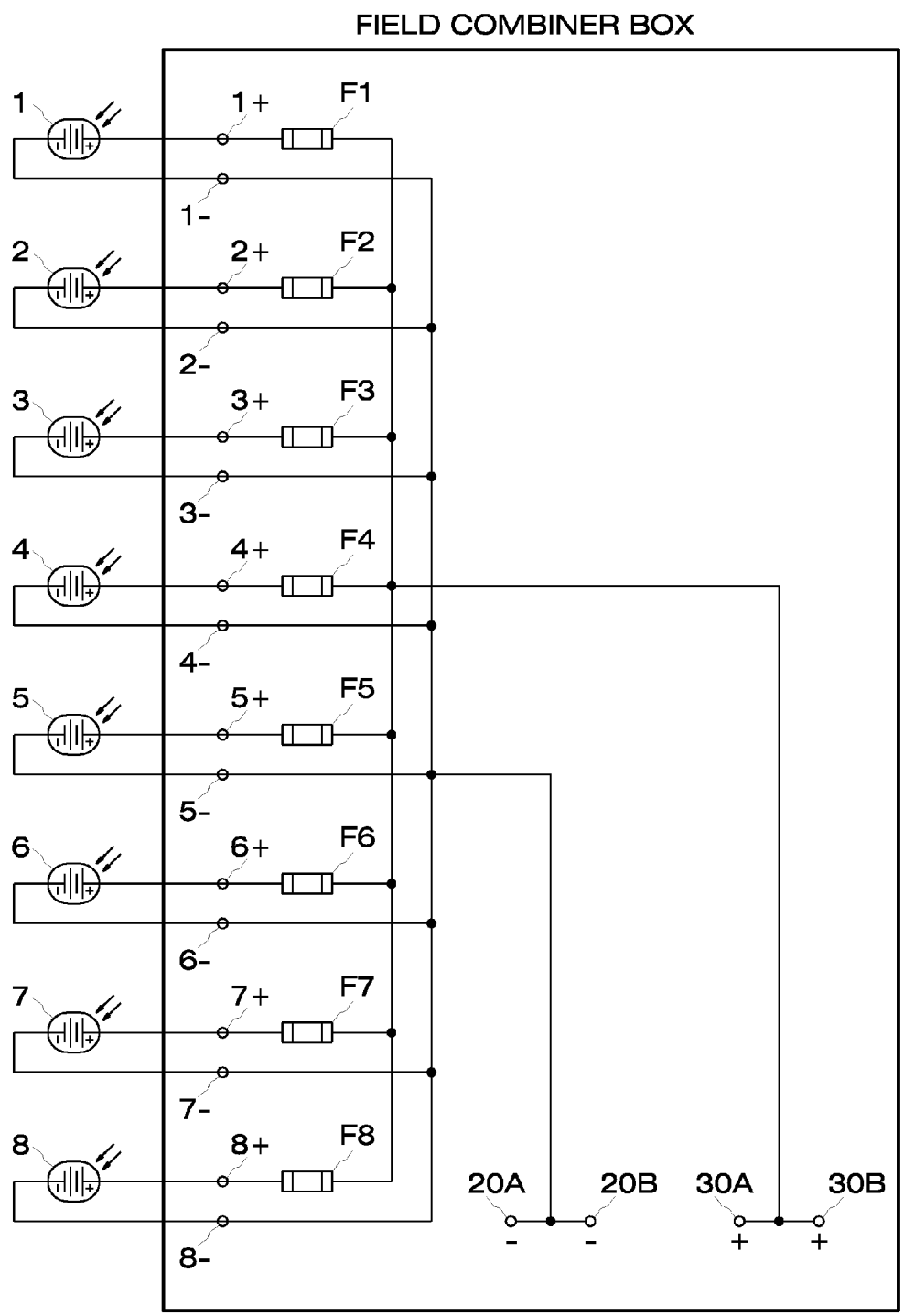
FIG. 2 is an electrical schematic of a field combiner box as disclosed in the FIG. 1 narrative.

FIG. 2 is an electrical schematic of the field combiner box disclosed in the proceeding FIG. 1 narrative. A field combiner box can be configured to accommodate any number of input and output circuits. FIG. 2 illustrates a configuration that accepts eight series string inputs and provides one combined output. Series string 1 comprises a number of photovoltaic modules electrically connected in series. Series string 1 is connected at field combiner box terminals 1+ and 1−. The positive pole is connected in series with fuse F1. Fuse F1 limits the (backfeed) fault current in the series string conductors and photovoltaic modules. Remaining series string circuits 2-8, inclusive, are connected in a similar manner. All fused circuits are connected in parallel and to output terminals 30A and 30B. All non-fused circuits are connected in parallel and to output terminals 20A and 20B. Double output terminals on each output pole facilitate daisy-chain connections from field combiner box to field combiner box.

Figure 3:
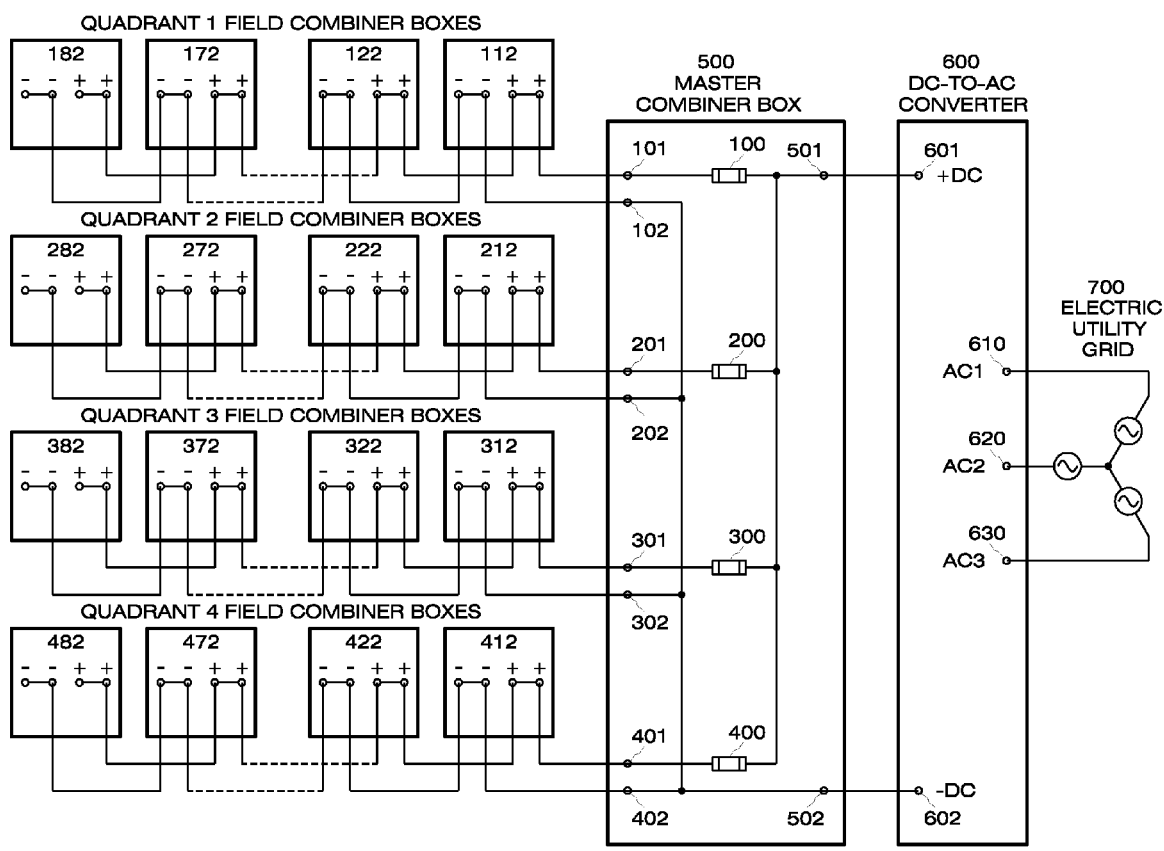
FIG. 3 illustrates how field combiner boxes are interconnected in a photovoltaic system, shows a schematic of a master combiner box and a block diagram for the remainder of the system.

FIG. 3 illustrates how field combiner boxes are interconnected, shows a schematic of the master combiner box and a block diagram for the remainder of the system. All reference designators in FIG. 3 are linked with and correspond to the reference designators in FIG. 1. In quadrant 1, field combiner boxes 112, 122, 132, 142, 152, 162, 172 and 182 are all connected output-to-output and to master combiner 500 input terminals 101 and 102. The positive pole is connected in series with fuse 100. Fuse 100 limits the fault current that could feed back into the field combiner box output circuits. The remaining three field combiner circuits from quadrants 2, 3 and 4 are connected in a similar manner. All fused input circuits are connected in parallel and to output terminal 501. All non-fused input circuits are connected in parallel and to output terminal 502. Master combiner box 500 output terminals 501 and 502 are connected to the input DC-to-AC converter 600 terminals 601 and 602. DC-to-AC converter 600 converts the DC power from all the photovoltaic modules in all quadrants to AC polyphase power. DC-to-AC converter 600 output terminals 610, 620 and 630 are connected to the electric utility grid point of service through underground conduit and conductors 700. In most systems a low voltage to medium voltage distribution transformer is used between the DC-to-AC converter output and the electric utility grid point of service to reduce AC power transmission losses.

Figure 4:
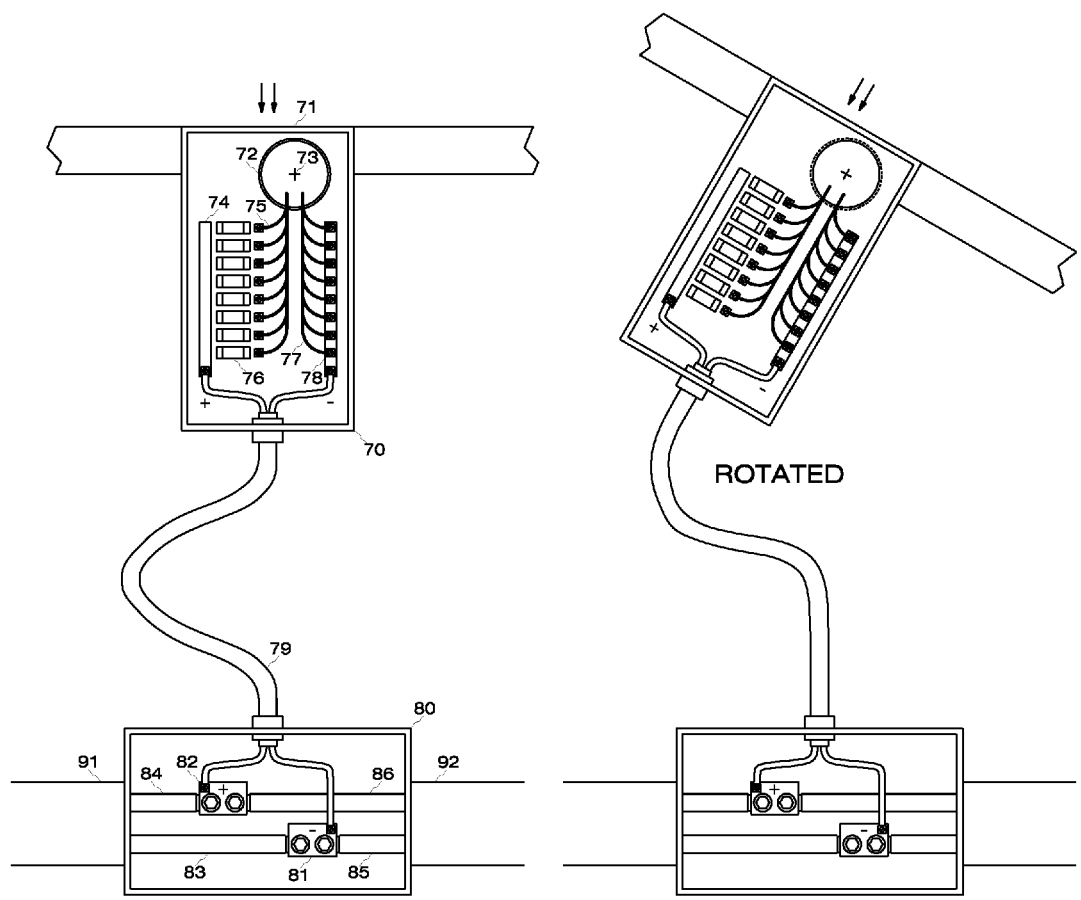
FIG. 4 illustrates a field combiner box which is attached to and rotates with the torque tube of a single axis tracker.

FIG. 4 illustrates a field combiner box which is attached to and rotates with the torque tube of a single axis tracker. The plane of array for the photovoltaic modules is identified by designator 71. The rotational axis of torque tube 72 is 73. Series string conductors 75 and 77 enter torque tube 72 along its length and exit the end connected to field combiner box 70. Fuses 76 provide overcurrent protection for series string circuits. Bus bar 74 collects the parallel circuit of all fused series string conductors. Bus bar 78 collects the parallel circuit of all non-fused series string conductors. Multi-conductor, flexible cable 79 connects field combiner box bus bar 74 to junction box 80 terminal 82, combiner box bus bar 78 is connected to junction box 80 terminal 81. Positive conductors 84 and 86 are common with terminal 82 and make connections with the next junction box in the field combiner box daisy-chain circuit. Negative conductors 83 and 85 are common with terminal 81 and make connections with the next junction box in the field combiner box daisy-chain circuit. Conductors 83 and 84 are enclosed in conduit 91. Conductors 85 and 86 are enclosed in conduit 92.

In a variant of the embodiment show in FIG. 4, a bus bar assembly replaces stranded conductors 83, 84, 85 and 86. Two bus bars are used, one for the positive circuit (82, 84, 86) and one for the negative circuit (81, 83, 85) with an insulting material between the two bus bars. 91 and 92 are non-metallic raceways. Bus bar sections may be spliced at junction box 80 locations. Terminal blocks 82 and 81 may serve a dual purpose, each splicing two bus bar sections, acting as a link plate, and each providing a terminal point for electrical connection to a conductor in flexible cord 79.

Simply stated, the invention is a photovoltaic power plant, the method of implementation and the design attributes thereof where two-tier DC power collection is used in concert with specific array field geometries and equipment locations to minimize system wiring costs and/or resistive wiring losses. One tier of DC power collection, designated as the low current tier, provides overcurrent protection for and combines in parallel a number of series PV module strings to form a high current circuit. The second tier of DC power collection, designated as the high current tier, provides overcurrent protection for and combines in parallel a number of said high current circuits. The invention is also a specific photovoltaic array field geometry and equipment layout that works in concert with the two-tier DC power collection, to provide the shortest conductor path length for high-current-tier conductors.

What I claim as my invention is:

1. A power plant for converting DC power from photovoltaic sources to AC power comprising; a plurality of photovoltaic modules, a plurality of components referenced herein as field combiner boxes, a component referenced herein as a master combiner box and a DC-to-AC power converter and wherein each said field combiner box comprises; a plurality of input ports, a plurality of fuses and an output port wherein each input port is coupled to a unique first fuse terminal and wherein a common coupling is made between a second fuse terminal of each of said plurality of fuses and said output port and furthermore wherein said master combiner box comprises; a plurality of input ports, a plurality of fuses and an output port wherein each input port is coupled to a unique first fuse terminal and wherein a common coupling is made between a second fuse terminal of each of said plurality of fuses and said output port and furthermore where said plurality of photovoltaic modules are electrically coupled to form a plurality of series strings and where each series string is coupled to a unique said input port of said field combiner box and where each said output port of each said field combiner box is coupled to a said input port of said master combiner and where said output port of said master combiner is connected to an input port of said DC-to-AC power converter.

2. The power plant for converting DC power from photovoltaic sources to AC power according to claim 1 comprising; two tiers of DC power collection and overcurrent protection; a low current tier and a high current tier wherein said low current tier is facilitated by said field combiner boxes, to provide localized power collection within a photovoltaic array field and wherein said high current tier is facilitated by said master combiner box or boxes to provide a final collection point for all DC power to be converted by said DC-to-AC converter and where a photovoltaic array field is physically configured to provide the shortest path for connections between said field combiner box output ports and said master combiner box input ports.

3. The power plant for converting DC power from photovoltaic sources to AC power according to claim 2 where said fuses are replaced by circuit breakers or any alternate means for overcurrent protection.

4. The power plant for converting DC power from photovoltaic sources to AC power according to claim 1 where a number of field combiner box output ports are electrically coupled in daisy-chain fashion where an output port of a first field combiner box is coupled to an output port of a second field combiner box and so on to any number of additional combiner box output ports and to a final field combiner box output port where a coupling is made from said final field combiner box output port to a master combiner box input port.

5. The power plant for converting DC power from photovoltaic sources to AC power according to claim 4 where said fuses are replaced by circuit breakers or any alternate means for overcurrent protection.

6. The power plant for converting DC power from photovoltaic sources to AC power according to claim 1 comprising; at least one single-axis tracker assembly, a flexible cable and a stationary junction box wherein said single-axis tracker assembly further comprises; an axial torque tube, a portion of said plurality of series strings of photovoltaic modules, one of said field combiner boxes and series string conductors, and where all four named single-axis tracker assembly elements rotate together and where said series string conductors are routed through said axial torque tube and couple the single-axis tracker assembly series strings to the single-axis tracker assembly field combiner box input ports and where the output port of said single-axis tracker assembly combiner box is coupled to said stationary junction box with said flexible cable.

7. The power plant for converting DC power from photovoltaic sources to AC power according to claim 6 where said fuses are replaced by circuit breakers or any alternate means for overcurrent protection.

8. The power plant for converting DC power from photovoltaic sources to AC power according to claim 1 where said fuses are replaced by circuit breakers or any alternate means for overcurrent protection.

9. A method for converting DC energy from photovoltaic sources to AC energy where series strings are created from a number of series-connected photovoltaic modules and associated series string conductors and where the series strings are protected from excessive current by series string fuses and then electrically connected in parallel to form a high current circuit which carries the sum of the paralleled series string circuit currents and where a number of said high current circuits are protected from excessive current by high current fuses and then electrically connected in parallel to form a circuit which carries the sum of the paralleled high current circuit currents which is in turn connected to a DC-to-AC power converter input and where a DC-to-AC power converter output is connected to a polyphase electrical utility grid, a polyphase electrical distribution system or a polyphase load.

10. A method according to claim 9 where a photovoltaic array field layout, arrangement or geometry is specifically designed to minimize conductor lengths in said high current circuit or circuits.

11. A method according to claim 9 where a number of high current circuits are collected in daisy-chain fashion, output to output, before connecting to overcurrent protection and then to a DC-to-AC converter input.

12. A method according to claim 9 where photovoltaic modules are attached to a mounting structure and where a structural member of the mounting structure is used as electrical conduit or raceway for series string conductors.

13. A method for converting DC energy from photovoltaic sources to AC according to claim 9 where said fuses are replaced by circuit breakers or any alternate means for overcurrent protection.

* * * * *